US012456358B2

(12) United States Patent
Cho

(10) Patent No.: US 12,456,358 B2
(45) Date of Patent: Oct. 28, 2025

(54) FIRE PROTECTION METHOD AND FIRE PROTECTION SYSTEM

(71) Applicant: ROZETATECH Co., Ltd., Seongnam-si (KR)

(72) Inventor: Youngjin Cho, Okcheon-gun (KR)

(73) Assignee: ROZETATECH Co., Ltd., Seongnam-si (KR)

( * ) Notice: Subject to any disclaimer, the term of this patent is extended or adjusted under 35 U.S.C. 154(b) by 71 days.

(21) Appl. No.: 18/247,081

(22) PCT Filed: Sep. 29, 2021

(86) PCT No.: PCT/KR2021/013355

§ 371 (c)(1),
(2) Date: Mar. 29, 2023

(87) PCT Pub. No.: WO2022/071760

PCT Pub. Date: Apr. 7, 2022

(65) Prior Publication Data

US 2023/0377435 A1 Nov. 23, 2023

(30) Foreign Application Priority Data

Sep. 29, 2020 (KR) ........................ 10-2020-0126626

(51) Int. Cl.
*G08B 17/00* (2006.01)
*G08B 25/10* (2006.01)

(52) U.S. Cl.
CPC ............. *G08B 17/00* (2013.01); *G08B 25/10* (2013.01)

(58) Field of Classification Search
CPC ................................ G08B 17/00; G08B 25/10

(Continued)

(56) References Cited

U.S. PATENT DOCUMENTS

2004/0183667 A1* 9/2004 Nicoletti ............ G08B 21/0469 340/506
2007/0241261 A1* 10/2007 Wendt .................... G08B 21/16 250/221

(Continued)

FOREIGN PATENT DOCUMENTS

CN 111179528 * 5/2020
JP 2019074837 A 5/2019

(Continued)

OTHER PUBLICATIONS

International Search Report Received in International Application No. PCT/KR2021/013355 mailed on Jan. 7, 2022, 6 pages.

*Primary Examiner* — Brian A Zimmerman
*Assistant Examiner* — Thang D Tran
(74) *Attorney, Agent, or Firm* — HoustonHogle LLP

(57) ABSTRACT

A fire protection system according to an embodiment of the inventive concept includes a plurality of sensors having different address values, detecting fire occurrence, generating a fire alarm, and performing Radio Frequency (RF) communication with each other, a first server configured to perform RF communication with each of the plurality of sensors, and a second server in communication with the first server, wherein the second server includes a building information modeling unit configured to virtually implement a plant and provide modeling, a synchronization unit configured to synchronize the modeling and sensor data measured from each of the plurality of sensors, and a simulation unit configured to provide fire information based on the synchronized modeling and sensor data and outputs a digital twin plant based on the fire information.

20 Claims, 6 Drawing Sheets

(58) Field of Classification Search
USPC .......................................................... 340/584
See application file for complete search history.

(56) References Cited

U.S. PATENT DOCUMENTS

| | | | | |
|---|---|---|---|---|
| 2007/0256105 | A1* | 11/2007 | Tabe | H04N 21/23 348/E7.086 |
| 2007/0283005 | A1* | 12/2007 | Beliles | H04L 41/0816 709/224 |
| 2009/0003832 | A1* | 1/2009 | Pederson | H05B 47/115 398/135 |
| 2011/0170377 | A1* | 7/2011 | Legaspi | G08B 25/009 367/199 |
| 2013/0242091 | A1* | 9/2013 | Park | G08B 13/196 348/143 |
| 2014/0114625 | A1* | 4/2014 | Ferre | G06F 17/11 703/2 |
| 2014/0166319 | A1* | 6/2014 | Shaik | A62C 37/36 169/61 |
| 2014/0222329 | A1* | 8/2014 | Frey | G08B 7/066 701/423 |
| 2015/0228183 | A1* | 8/2015 | Rothkopf | G08B 25/10 340/539.1 |
| 2016/0321900 | A1* | 11/2016 | Rao | B05B 12/12 |
| 2017/0032632 | A1* | 2/2017 | Joseph | H04W 4/90 |
| 2017/0070210 | A1* | 3/2017 | Kultran | H03H 15/00 |
| 2017/0103491 | A1* | 4/2017 | Bora | G06Q 90/205 |
| 2017/0109422 | A1* | 4/2017 | Satkunarajah | G06F 16/27 |
| 2017/0230930 | A1* | 8/2017 | Frey | H04W 64/003 |
| 2018/0110416 | A1* | 4/2018 | Masuda | G01J 5/0816 |
| 2018/0350207 | A1* | 12/2018 | Yang | A62C 37/40 |
| 2019/0149661 | A1* | 5/2019 | Klaban | H04M 7/0075 379/45 |
| 2019/0212865 | A1* | 7/2019 | Shiroto | G06F 3/016 |
| 2019/0244492 | A1* | 8/2019 | Horgan | G08B 13/08 |
| 2019/0343253 | A1* | 11/2019 | Gharabegian | G10L 15/26 |
| 2019/0346417 | A1* | 11/2019 | Benefield | F24F 11/58 |
| 2020/0226916 | A1* | 7/2020 | Lim | G08B 17/06 |
| 2020/0388120 | A1* | 12/2020 | Paturu | H04W 4/029 |
| 2022/0044538 | A1* | 2/2022 | Al-Yousef | G08B 21/02 |
| 2022/0272491 | A1* | 8/2022 | Frey | H04W 4/02 |

FOREIGN PATENT DOCUMENTS

| | | | |
|---|---|---|---|
| KR | 20120125761 | A | 11/2012 |
| KR | 20180125658 | * | 11/2018 |
| KR | 20180125658 | A | 11/2018 |
| KR | 20190120729 | A | 10/2019 |
| KR | 20200029180 | A | 3/2020 |
| KR | 102124067 | B1 | 6/2020 |
| KR | 20200078074 | A | 7/2020 |

* cited by examiner

FIRE PROTECTION METHOD AND FIRE PROTECTION SYSTEM

RELATED APPLICATIONS

This application is a § 371 National Phase Application of International Application No. PCT/KR2021/013355, filed on Sep. 29, 2021, now International Publication No. WO2022/071760 A1, published on Apr. 7, 2022, which International Application claims priority to Korean Patent Application 10-2020-0126626, filed on Sep. 29, 2020, both of which are incorporated herein by reference in their entirety.

TECHNICAL FIELD

The inventive concept relates to a fire protection system, and more specifically, to a fire protection system that provides sensor data sensed by a plurality of sensors to a user using a digital twin.

BACKGROUND ART

In general, when a fire situation occurs in a power plant, it may lead to a major accident. Therefore, power plants are equipped with a fire protection system to reduce damage in case of fire. It is important for power plants not only to respond to fire situations, but also to prevent fire situations before they occur. However, conventionally, it is difficult to respond according to circumstances due to different fire evaluation standards for each facility equipped with a power plant. Therefore, response to a fire situation may not be prompt.

DISCLOSURE OF THE INVENTION

Technical Problem

An object of the inventive concept is to provide a fire protection system that provides sensor data sensed by a plurality of sensors to a user using a digital twin.

Technical Solution

A fire protection system according to an embodiment of the inventive concept includes a plurality of sensors having different address values, detecting fire occurrence, generating a fire alarm, and performing Radio Frequency (RF) communication with each other, a first server configured to perform RF communication with each of the plurality of sensors, and a second server in communication with the first server, wherein the second server includes a building information modeling unit configured to virtually implement a plant and provide modeling, a synchronization unit configured to synchronize the modeling and sensor data measured from each of the plurality of sensors, and a simulation unit configured to provide fire information based on the synchronized modeling and sensor data and outputs a digital twin plant based on the fire information.

The sensor data may include at least one of vibration, sound, valve, harmful gas, heat, smoke, flame, and explosion, wherein the simulation unit may determine overload, fire, disaster, and disaster signs based on the sensor data.

The guide unit may include fire evaluation criteria output for each facility of the plant.

The second server may receive big data from the outside, and the simulation unit may complement the digital twin plant based on the big data.

The second server may further include a guide unit outputting an action plan to the digital twin plant based on the fire information.

The guide unit may include fire evaluation criteria output for each facility of the plant.

The guide unit may compare the fire evaluation criteria and the sensor data, and when the sensor data exceeds the fire evaluation criteria, the second server may output a preliminary warning message.

The guide unit may output fire evaluation criteria for each space, use, or fuel based on the fire information.

The guide unit may calculate a fire occurrence probability based on the fire evaluation criteria, and when the fire occurrence probability is greater than or equal to a predetermined value, the second server may output a preliminary warning message.

A fire protection method using digital twin according to an embodiment of the inventive concept includes measuring sensor data by a plurality of sensors that sense a fire occurrence and generate a fire alarm, providing modeling by virtually implementing a plant, synchronizing the modeling and the sensor data, providing fire information based on the synchronized modeling and sensor data, and outputting a digital twin plant based on the fire information.

The method may further include outputting an action plan to the digital twin plant based on the fire information.

The outputting of the action plan may include outputting fire evaluation criteria for each facility included in the plant and comparing the fire evaluation criteria and the sensor data.

The method may further include outputting a preliminary warning message when the sensor data exceeds the fire evaluation criteria.

The outputting of the action plan may include outputting fire evaluation criteria for each space, use, or fuel based on the fire information, and calculating a fire occurrence probability based on the fire evaluation criteria.

The method may further include outputting a preliminary warning message when the fire occurrence probability is greater than or equal to a predetermined value.

Advantageous Effects

A fire protection system according to an embodiment of the inventive concept includes a plurality of sensors having different address values, detecting fire occurrence, generating a fire alarm, and performing Radio Frequency (RF) communication with each other, a first server configured to perform RF communication with each of the plurality of sensors, and a second server in communication with the first server, wherein the second server includes a building information modeling unit configured to virtually implement a plant and provide modeling, a synchronization unit configured to synchronize the modeling and sensor data measured from each of the plurality of sensors, and a simulation unit configured to provide fire information based on the synchronized modeling and sensor data and outputs a digital twin plant based on the fire information.

The sensor data may include at least one of vibration, sound, valve, harmful gas, heat, smoke, flame, and explosion, wherein the simulation unit may determine overload, fire, disaster, and disaster signs based on the sensor data.

The guide unit may include fire evaluation criteria output for each facility of the plant.

The second server may receive big data from the outside, and the simulation unit may complement the digital twin plant based on the big data.

The second server may further include a guide unit outputting an action plan to the digital twin plant based on the fire information.

The guide unit may include fire evaluation criteria output for each facility of the plant.

The guide unit may compare the fire evaluation criteria and the sensor data, and when the sensor data exceeds the fire evaluation criteria, the second server may output a preliminary warning message.

The guide unit may output fire evaluation criteria for each space, use, or fuel based on the fire information.

The guide unit may calculate a fire occurrence probability based on the fire evaluation criteria, and when the fire occurrence probability is greater than or equal to a predetermined value, the second server may output a preliminary warning message.

A fire protection method using digital twin according to an embodiment of the inventive concept includes measuring sensor data by a plurality of sensors that sense a fire occurrence and generate a fire alarm, providing modeling by virtually implementing a plant, synchronizing the modeling and the sensor data, providing fire information based on the synchronized modeling and sensor data, and outputting a digital twin plant based on the fire information.

The method may further include outputting an action plan to the digital twin plant based on the fire information.

The outputting of the action plan may include outputting fire evaluation criteria for each facility included in the plant and comparing the fire evaluation criteria and the sensor data.

The method may further include outputting a preliminary warning message when the sensor data exceeds the fire evaluation criteria.

The outputting of the action plan may include outputting fire evaluation criteria for each space, use, or fuel based on the fire information, and calculating a fire occurrence probability based on the fire evaluation criteria.

The method may further include outputting a preliminary warning message when the fire occurrence probability is greater than or equal to a predetermined value.

MODE FOR CARRYING OUT THE INVENTION

Figure 1:
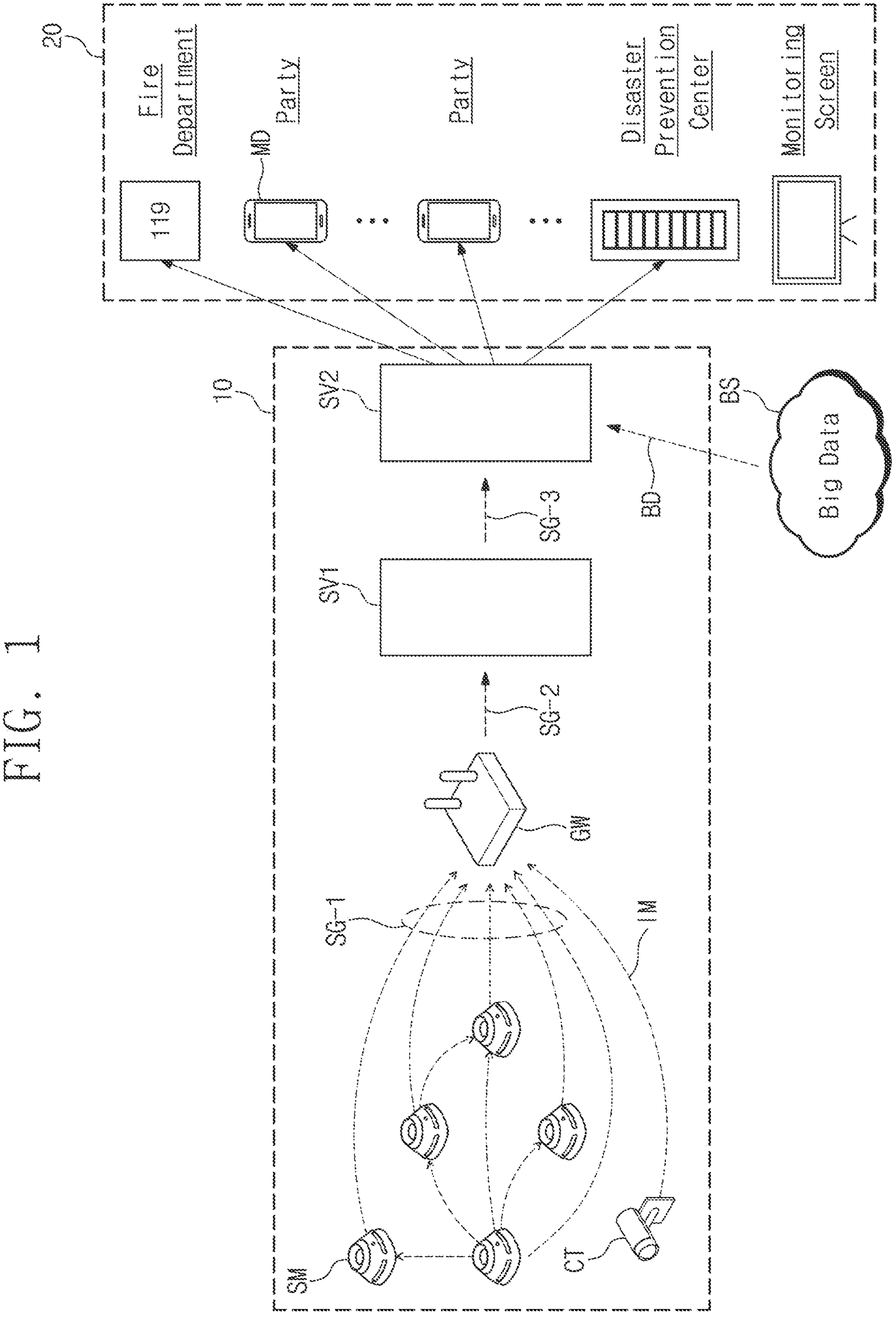
FIG. 1 illustrates a fire protection system according to an embodiment of the inventive concept.

In this specification, when an element (or region, layer, part, etc.) is referred to as being "on", "connected to", or "coupled to" another element, it means that it may be directly placed on/connected to/coupled to other components, or a third component may be arranged between them.

Like reference numerals refer to like elements. Additionally, in the drawings, the thicknesses, proportions, and dimensions of components are exaggerated for effective description.

"And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the inventive concept. The terms of a singular form may include plural forms unless otherwise specified.

In addition, terms such as "below", "the lower side", "on", and "the upper side" are used to describe a relationship of configurations shown in the drawing. The terms are described as a relative concept based on a direction shown in the drawing.

Unless otherwise defined, all terms (including technical and scientific terms) used herein have the same meaning as commonly understood by one of ordinary skill in the art to which this inventive concept belongs. In addition, terms defined in a commonly used dictionary should be interpreted as having a meaning consistent with the meaning in the context of the related technology, and unless interpreted in an ideal or overly formal sense, the terms are explicitly defined herein.

In various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Hereinafter, embodiments of the inventive concept will be described with reference to the drawings.

Figure 2:
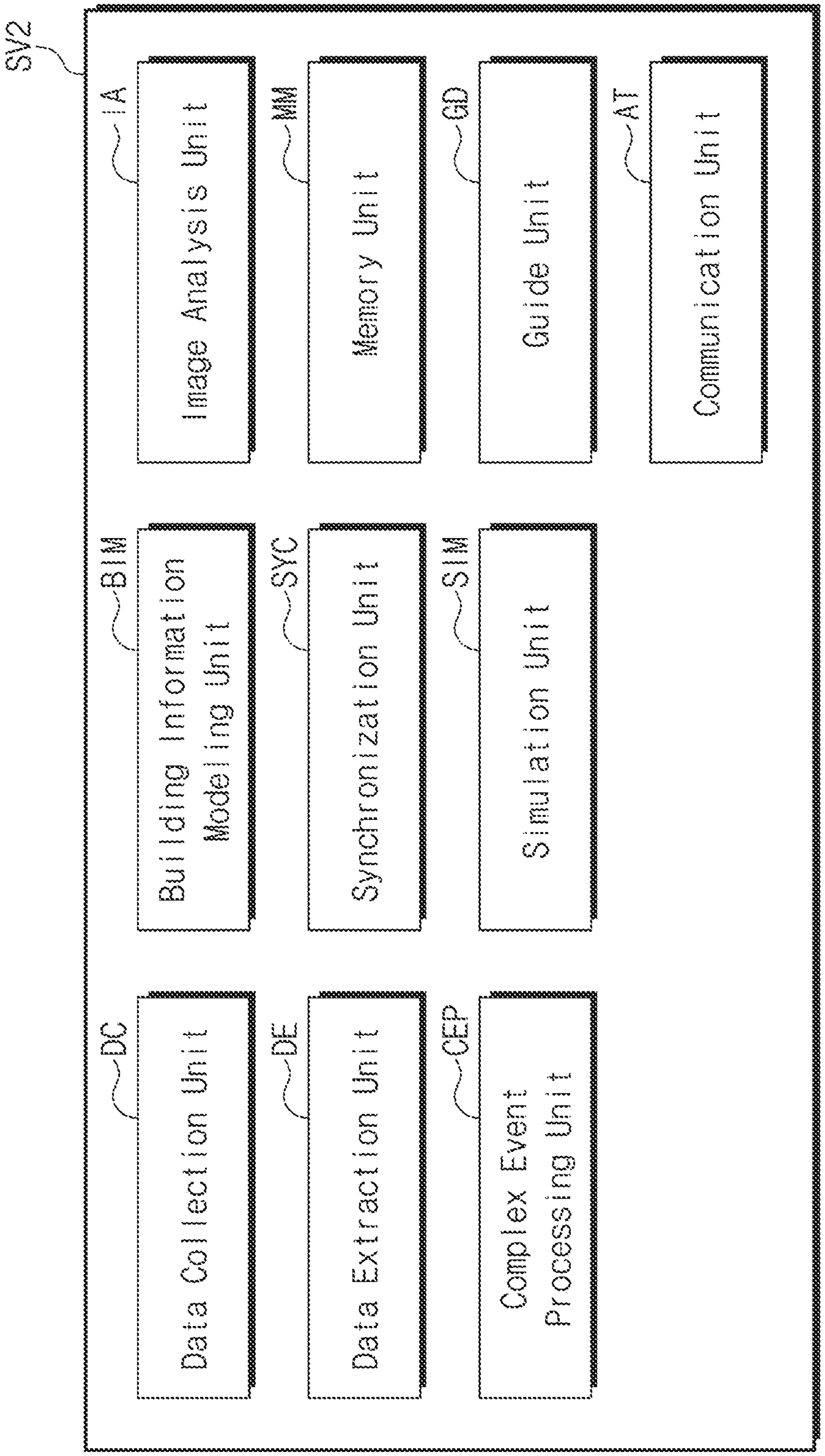
FIG. 2 illustrates a second server according to an embodiment of the inventive concept.

FIG. 1 illustrates a fire protection system according to an embodiment of the inventive concept, and FIG. 2 illustrates a second server according to an embodiment of the inventive concept.

Referring to FIGS. 1 and 2, the fire protection system 10 may include a plurality of sensors SM, an image recording unit CT, a repeater GW, a first server SV1, and a second server SV2.

Each of the plurality of sensors SM may detect whether a fire has occurred. In FIG. 1, five sensors SM are shown as an example, but are not limited thereto. Each of the plurality of sensors SM may transmit a first fire detection signal SG-1 to adjacent sensors SM and/or repeater GW.

The first fire detection signal SG-1 may be a signal generated by the sensor SM detecting whether a fire has occurred or a signal amplified by the sensor SM.

A radio frequency (RF) communication method may be used as a method of transmitting the first fire detection signal SG-1. The RF communication method may be a communication method for exchanging information by radiating a RF. The RF communication method is a broadband communication method using frequency, and may be less affected by climate and environment, and may have high stability. In the RF communication method, voice or other additional functions may be interlocked and the transmission speed may be high. For example, the RF communication method may use a frequency of 447 MHz to 924 MHz. However, this is exemplary and in an embodiment of the inventive concept, a communication method such as Ethernet, Wifi, LoRA, M2M, 3G, 4G, LTE, LTE-M, Bluetooth, or WiFi Direct may be used.

In an embodiment of the inventive concept, the RF communication method may include a Listen Before Transmission (LBT) communication method. This is a frequency selection method that determines whether the selected frequency is being used by another system and selects another frequency when it is determined that the selected frequency is occupied. For example, a node that intends to transmit may first listen to the medium, determine if it is in an idle state, and then flush the backoff protocol prior to transmission. By distributing data using this LBT communication method, collisions between signals in the same band may be prevented.

A repeater GW may communicate with a plurality of sensors SM. The repeater GW may receive the first fire detection signal SG-1 from the plurality of sensors SM. The repeater GW may convert the first fire detection signal SG-1 into a second fire detection signal SG-2. The repeater GW may transmit the second fire detection signal SG-2 to the first server SV1. The RF communication method may be used as a method of transmitting the second fire detection signal SG-2.

The first server SV1 may receive the second fire detection signal SG-2 from the repeater GW. For example, a plurality of repeaters GW may be provided, and the first server SV1 may receive a second fire detection signal SG-2 from the plurality of repeaters GW.

The first server SV1 may convert the second fire detection signal SG-2 into a third fire detection signal SG-3. The first server SV1 may transmit a third fire detection signal SG-3 to the second server SV2. The RF communication method may be used as a method of transmitting the third fire detection signal SG-3. Each of the first to third fire detection signals SG-1, SG-2, and SG-3 may be referred to as sensor data. Hereinafter, each of the first to third fire detection signals SG-1, SG-2, and SG-3 may be referred to as sensor data SG-1, SG-2, and SG-3. The sensor data SG-1, SG-2, and SG-3 may include at least one of vibration, sound, valve, noxious gas, heat, smoke, flame, and explosion.

The second server SV2 may receive the third fire detection signal SG-3 from the first server SV1. For example, a plurality of first servers SV1 may be provided, and a second server SV2 may receive a third fire detection signal SG-3 from the plurality of first servers SV1.

The second server SV2 may receive big data BD from an external server BS. Big data BD may be periodically updated. Big data BD is a means of predicting a diversified society, which may refer to data of a size that exceeds the ability of common software tools to collect, manage, and process in an acceptable elapsed time. This large amount of data may provide more insight than traditionally limited data. Big data BD may include data by space, use, fuel, or facility of a power plant.

The second server SV2 may include a data collection unit DC, a data extraction unit DE, a complex event processing unit CEP, a building information modeling unit BIM, a synchronization unit SYC, a simulation unit SIM, an image analysis unit IA, a memory unit MM, a guide unit GD, and a communication unit AT.

The data collection unit DC may collect sensor data SG-1, SG-2, and SG-3 measured from each of the plurality of sensors SM and big data BD.

The data extraction unit DE may extract data necessary for determining the fire situation based on the data collection unit DC.

The complex event processing unit CEP may process a complex event based on the data necessary for determining a fire situation.

The building information modeling unit BIM may virtually implement a plant. The plant may be a power plant or a factory in which a plurality of sensors SM and an image recording unit CT are disposed. For example, in the inventive concept the plant may be a fire power plant.

The synchronization unit SYC may synchronize the virtual plant implemented in the building information modeling unit BIM, sensor data SG-3, and big data BD.

The simulation unit SIM may output a digital twin plant using the digital twin based on the synchronized virtual plant, sensor data SG-1, SG-2, and SG-3, and big data BD. The simulation unit SIM may determine overload, fire, disaster, and signs of disaster based on the sensor data SG-1, SG-2, and SG-3.

The digital twin may refer to a digital virtual object implemented in a digital environment by replicating the same environment as a real plant through software. In the digital twin plant, the actual plant and the digital twin plant are interlocked to collect data generated from various devices, parts, devices, and sensors included in the plant in real time and provide the data to the plant operator. The plant operator may check the fire situation that may occur in the plant in real time through the digital twin plant, which is a virtual implementation of the actual plant, and may respond immediately. Thus, the plant operator may operate the plant in an optimal condition.

The fire protection system 10 according to an embodiment of the inventive concept enables efficient plant management by using a digital twin including 3D modeling that virtually implements an actual plant.

The image analysis unit IA may analyze the image IM captured by the image recording unit CT.

The memory unit MM may store information collected in the data collection unit DC. The memory unit MM may include a volatile memory or a non-volatile memory. Volatile memory may include DRAM, SRAM, flash memory, or FeRAM. Non-volatile memory may include SSD or HDD.

The guide unit GD may output action plans based on fire information to the digital twin plant output from the simulation unit SIM. The guide unit GD may compare fire evaluation criteria and sensor data SG-3. For example, when the sensor data SG-3 exceeds the fire evaluation standard, the communication unit AT may output a preliminary warning message to the party 20.

The communication unit AT may transmit an anomaly early detection signal to a plurality of parties 20 based on the fire data extracted by the data extraction unit DE.

The second server SV2 may output fire information based on the third fire detection signal SG-3. The communication unit AT may transmit the fire information to a plurality of parties 20.

The plurality of parties 20 may include, for example, a fire station 119, parties in an area where a fire has occurred, a disaster prevention center (or a public institution related to fire and disaster prevention), and the like. The plurality of parties 20 may receive the fire alarm message in the form of a text message, a video message, or a voice message through a landline phone, a smart phone, or other mobile terminal.

Figure 3:
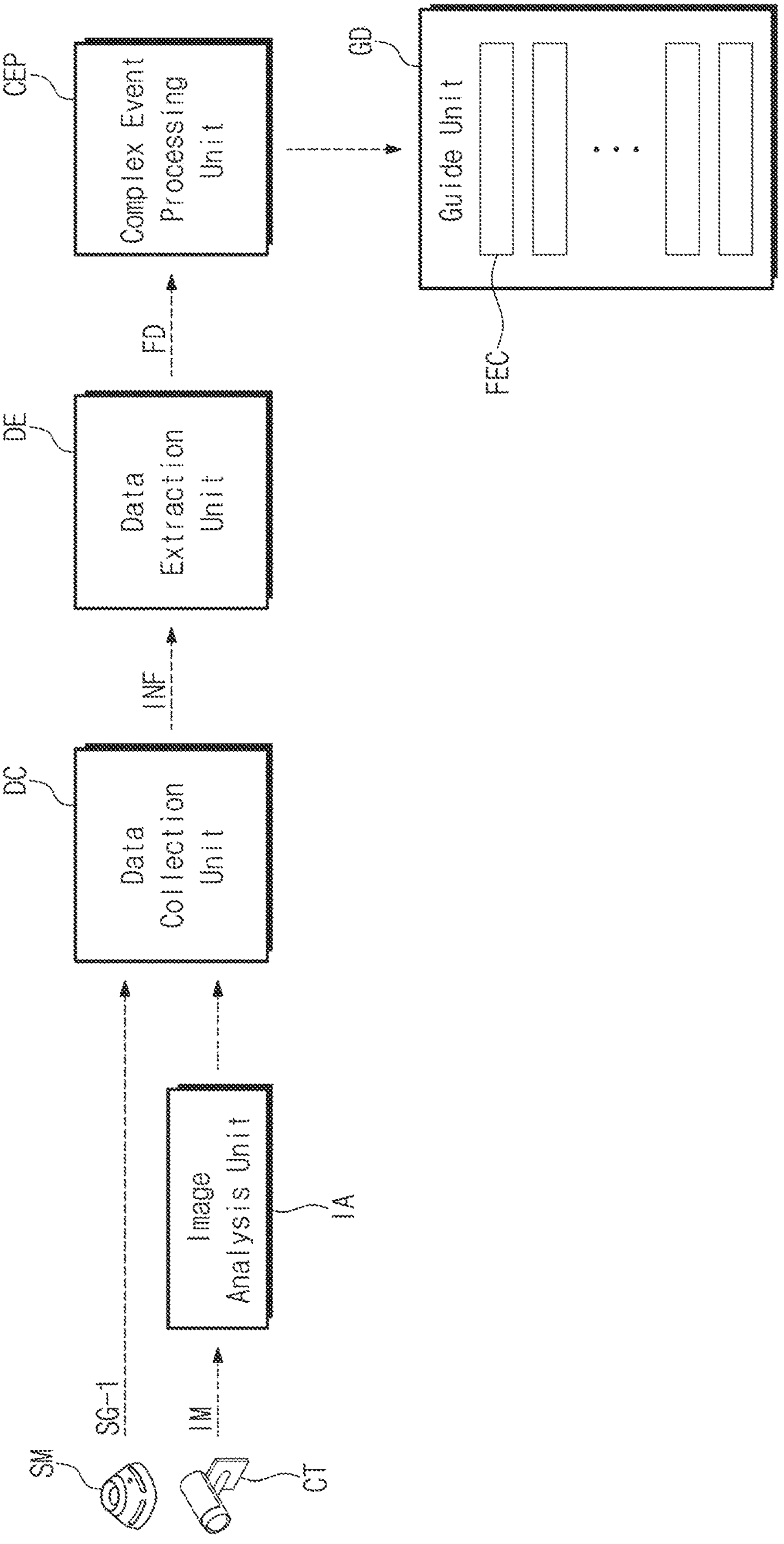
FIG. 3 shows a part of a fire protection system according to an embodiment of the inventive concept.
Figure 4:
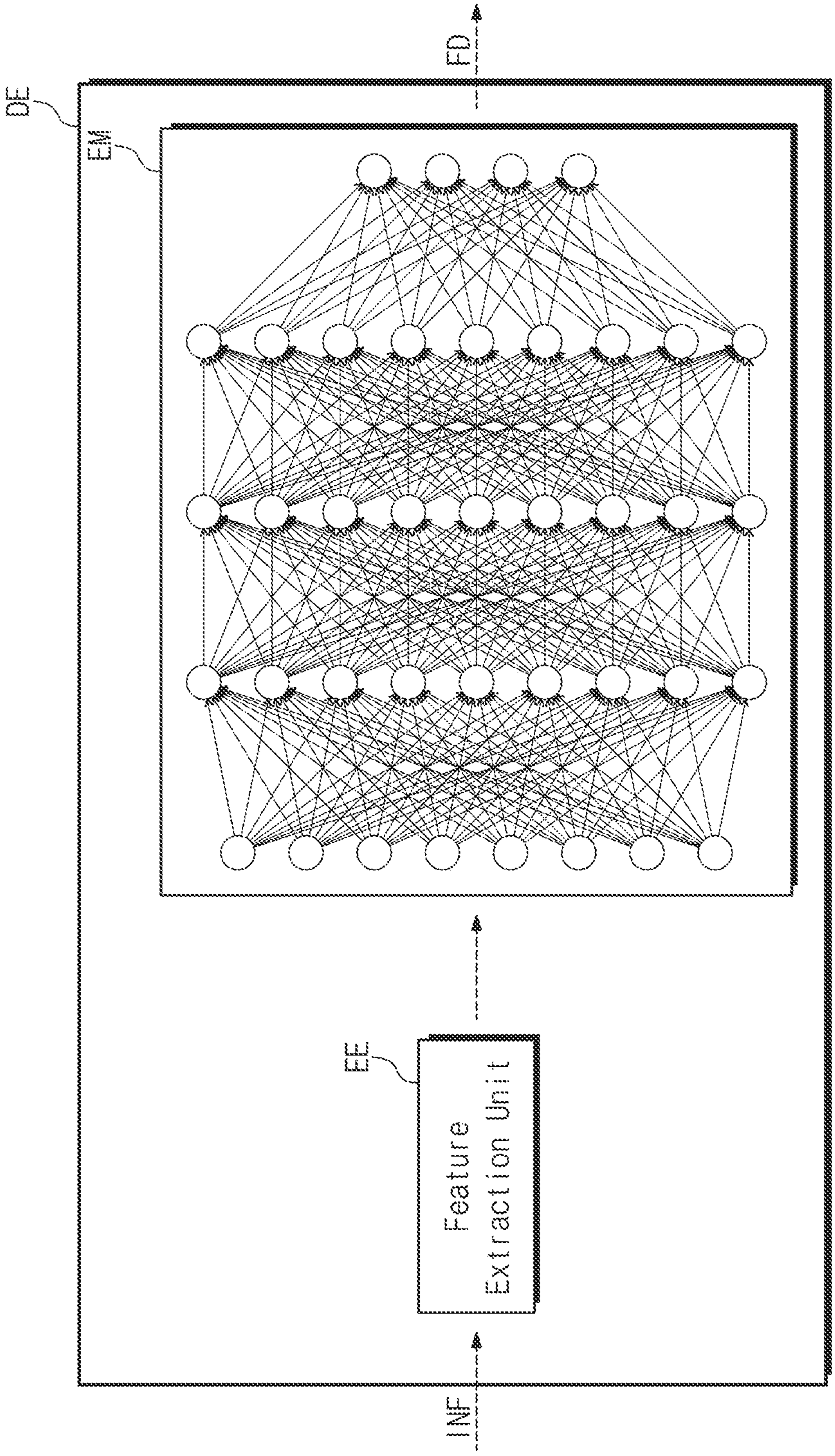
FIG. 4 illustrates a data extraction unit according to an embodiment of the inventive concept.

FIG. 3 shows a part of a fire protection system according to an embodiment of the inventive concept, and FIG. 4 shows a data extraction unit according to an embodiment of the inventive concept.

Referring to FIGS. 3 and 4, the plurality of sensors SM may detect at least one of heat, smoke, vibration, and noxious gas. The plurality of sensors SM may transmit sensor data SG-1 to the data collection unit DC through the repeater GW and the first server SV1.

The image recording unit CT may transmit the captured image IM to the image analysis unit IA. For example, an image recording unit CT may include drones and CCTVs. The image analysis unit IA may analyze the image IM.

The data collection unit DC may collect sensor data SG-1, data output from the image analysis unit IA, and big data BD. The data collection unit DC may output information INF based on the collected data. The information INF may be measured values including vibration, oil pressure, sound, valve, harmful gas, heat, temperature, smoke, flame, explosion, and the like.

The data extraction unit DE may process and/or process information INF. The data extraction unit DE may output fire data FD based on the information INF. The data extraction unit DE may include a feature extraction unit EE and a learning model EM.

The feature extraction unit EE may extract outliers such as vibration, hydraulic pressure, sound, valve, harmful gas, heat, temperature, smoke, flame, and explosion. The outliers may be outliers caused by mechanical wear or coupling. A feature extraction unit EE may classify the characteristics of the outliers and set tags for each outlier.

The feature extraction unit EE may collect an image IM from the data collection unit DC and extract an image related to a fire from among the images IM.

The learning model EM may determine whether the information INF is the fire data FD necessary for determining the fire situation. The fire data FD may include the outlier.

The learning model EM may be artificial intelligence that determines the fire data FD by machine learning the information INF. The artificial intelligence may mean artificial intelligence or a methodology for creating it, and machine learning may mean a methodology for defining various problems dealt with in the field of artificial intelligence and solving them. The machine learning may be defined as an algorithm that increases the performance of a certain task through continuous experience.

The learning model EM may include a deep neural network. The deep neural network may be designed to simulate human brain structure on a learning model EM. The deep neural network, as one of the models used in the machine learning, may refer to an overall model that is composed of artificial neurons (nodes) that form a network by synaptic coupling and has problem-solving capabilities. The deep neural network may be defined by a connection pattern between neurons of different layers, a learning process for updating model parameters, and an activation function for generating output values.

The deep neural network may include an input layer, an output layer, and at least one hidden layer. Each layer may include one or more neurons, and the deep neural network may include neurons and synapses connecting the neurons. In the deep neural network, each neuron may output a function value of an activation function for signals, weights, and deflections input through synapses.

The deep neural network may be trained according to supervised learning. The purpose of the supervised learning may be to find a predetermined answer through an algorithm. Accordingly, the deep neural network based on the supervised learning may include a form of inferring a function from training data. In the supervised learning, labeled samples may be used for training. The labeled sample may mean a target output value to be inferred by the deep neural network when training data is input to the deep neural network.

The algorithm may receive a series of learning data and a target output value corresponding thereto, find an error through learning to compare the actual output value and the target output value for the input data, and modify the algorithm based on the result.

The fire data FD extracted from the learning model EM may be stored in the memory unit MM (see FIG. 2).

According to the inventive concept, based on real-time sensor data SG-1 of the phenomenon, a real-time image IM of the field, fire data FD stored in the memory unit MM (see FIG. 2), and a learning model EM, it is possible to predict problems that will occur in the plant or solve problems that occur in the plant.

The second server SV2 may determine whether to output a preliminary warning message based on the outlier and sensor data SG-1.

A complex event processing unit CEP may receive an event of fire data FD. For example, the event may include an event in which heat or smoke is excessively generated, an event in which harmful gas or volatile gas is detected in a boiler room, and an overheating or fire event in desulfurization equipment, dust collectors, or silo sections. The complex event processing unit CEP may process complex events through convergence, pattern matching, and filtering of the events. The complex event may include an event in which harmful gas, heat, and smoke are excessively generated. A complex event processing unit CEP may classify fire data FD based on the complex event.

The complex event processing unit CEP may output fire evaluation criteria FEC for each space, use, or fuel based on the fire data FD. The complex event processing unit CEP may output fire evaluation criteria FEC for each facility included in the plant based on the fire data FD.

For example, a complex event processing unit CEP may output fire evaluation criteria FEC for a boiler or a hydraulic tank included in a hydraulic facility. The fire evaluation criteria (FEC) for the hydraulic tank may have a criterion that the hydraulic tank is dangerous when the hydraulic pressure exceeds 532 $m^3$, and may have a criterion that the hydraulic tank is dangerous when the heat value is 0.01 MWh or more. In addition, when the external temperature is 45° C. or higher, the hydraulic tank may have a criterion that it is dangerous.

For example, the complex event processing unit CEP may output fire evaluation criteria FEC for a rotating body or a vacuum pump included in a CV pump installation. Fire evaluation criteria FEC for the vacuum pump may have a criterion that the vacuum pump is dangerous when the ultimate pressure is 13 Pz or more, and may have a criterion that the vacuum pump is dangerous when the noise is 80 dB or more. In addition, when the vapor pressure is 50 Pa or more, the vacuum pump may have a criterion that it is dangerous.

A complex event processing unit CEP may process the complex event in real time. The complex event processing unit CEP may determine whether an input event is a registered event using a single event rule stored in the memory MM. If the entered event is determined not to be a complex event, the complex event processing unit CEP may wait for another event to occur for a predetermined period of time, and if another event occurs before the predetermined time elapses, may further determine whether or not a complex event is present by fusing with an already input event.

Fire evaluation criteria FEC may be output based on the complex event of the complex event processing unit CEP. The guide unit GD may include fire evaluation criteria FEC output for each plant facility.

The guide unit GD may calculate the probability of fire occurrence based on the fire evaluation criteria FEC. The guide unit GD may output a preliminary warning message to the simulation unit SIM when the fire probability is greater than or equal to a predetermined value. The communication unit AT (see FIG. 2) of the second server SV2 (see FIG. 1) may transmit a preliminary warning message to the parties 20 (see FIG. 1) when the fire occurrence probability is greater than or equal to a predetermined value.

The guide unit GD may output fire information based on modeling and sensor data SG-3 (see FIG. 1) output from the building information modeling unit BIM (see FIG. 2). The guide unit GD may transmit a countermeasure plan to the simulation unit SIM (see FIG. 2) based on the fire information. The countermeasure plan may include a response procedure for vulnerable facilities, a response procedure in the event of a fire or abnormal symptoms, identification of major fire cause factors, and an optimal operation plan for facilities.

According to the inventive concept, the fire protection system 10 may collect data in real time from a plurality of sensors SM, an image recording unit CT, and big data BD (see FIG. 1). Based on the data, fire evaluation criteria FEC may be output through a data extraction unit DE and a complex event processing unit CEP. The fire protection system 10 may detect fires or abnormal signs by major facilities and zones of a power plant at an early stage based on fire evaluation criteria FEC. In addition, it is possible to derive or detect fire and disaster occurrence factors in advance by applying a learning model EM. The guide unit GD may present operating conditions of power plant facilities to prevent fire by providing action plans. Accordingly, the reliability of detecting a fire situation may be improved, and the risk of fire to major facilities may be reduced.

Figure 5:
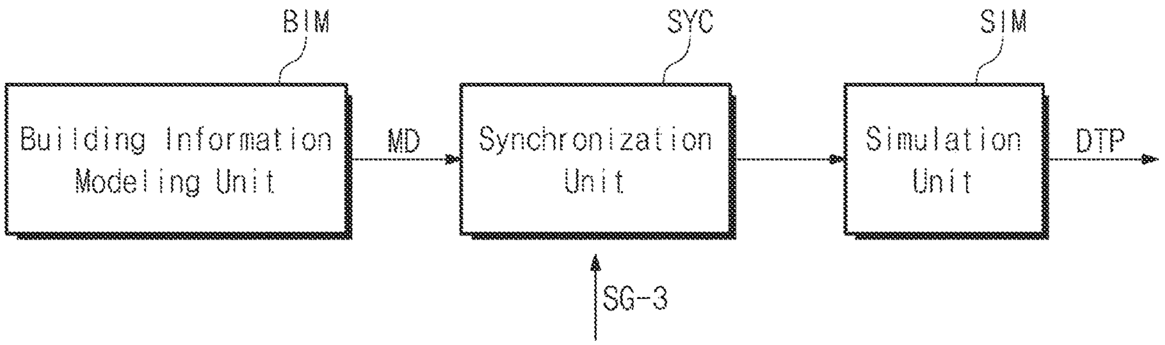
FIG. 5 shows a part of a fire protection system according to an embodiment of the inventive concept.
Figure 6:
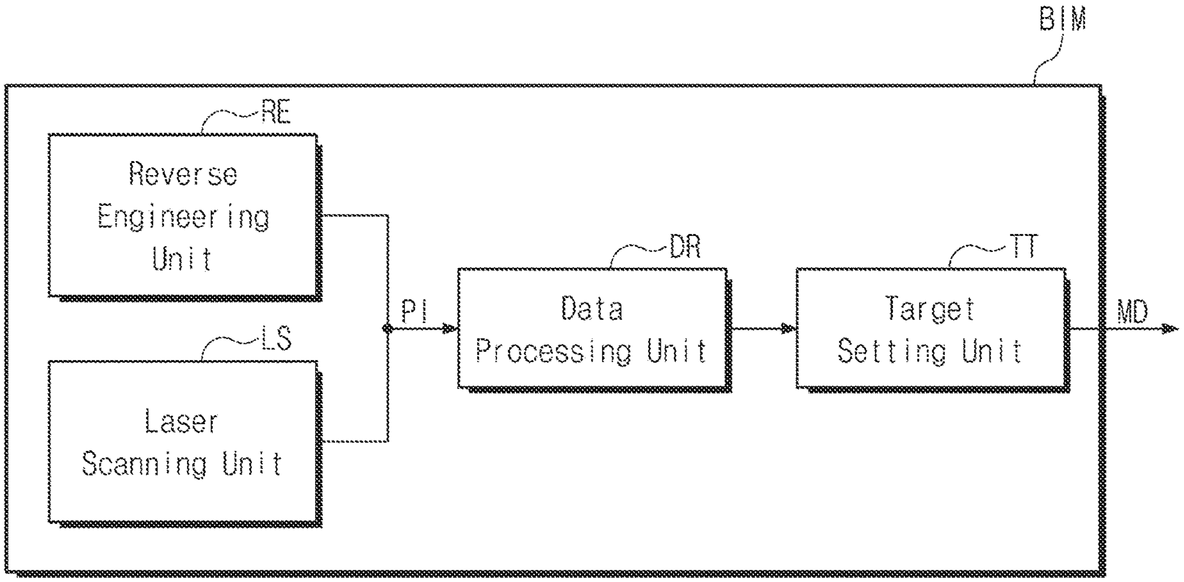
FIG. 6 illustrates a building information modeling unit according to an embodiment of the inventive concept.

FIG. 5 illustrates a part of a fire protection system according to an embodiment of the inventive concept, and FIG. 6 illustrates a building information modeling unit according to an embodiment of the inventive concept.

Referring to FIGS. 5 and 6, the building information modeling unit BIM may virtually implement a plant and output a modeling MD.

The building information modeling unit BIM may include a reverse engineering unit RE, a laser scanning unit LS, a data processing unit DR, and a target setting unit TT.

The reverse engineering unit RE may transmit data PI for virtually implementing the plant using the plant's modeling data and drawings to the data processing unit DR.

The laser scanning unit LS may scan indoor and/or outdoor facilities using a laser scanning device, and transmit data PI obtained by extracting the scanning image and pointer data to the data processing unit DR.

The data processing unit DR may process the data PI and transmit the processed data PI to the target setting unit TT.

The target setting unit TT may reduce the possibility of occurrence of a non-overlapping part between the data, that is, a blind spot in the modeling MD virtually implemented based on the data received from the data processing unit DR. The target setting unit TT may output the modeling MD by facility, zone, and risk. For example, a boiler, a steam turbine, and a generator may be modeled in facility-specific modeling MD, and modeling of the boiler may include modeling of the main body and each combustion device. Modeling of the steam turbine may include modeling each of the casing and the rotor. Modeling of the rotor may include modeling of each of a shaft, a rotor blade, and a nozzle. Modeling of the generator may include modeling of each of the stator and the rotor.

The target setting unit TT may be selected as a priority for modeling MD, which virtually implements functions for the possibility of occurrence of overload, fire, disaster, and abnormal symptoms of major facilities based on the data received from the data processing unit DR. The main facilities may include steam turbines, desulfurization facilities, boilers, generators, and the like.

The synchronization unit SYC may receive modeling MD and sensor data SG-3. Synchronization unit SYC may synchronize modeling MD and sensor data SG-3. The synchronizing unit SYC may synchronize the sensor data SG-3 measured in real time from a plurality of sensors SM (see FIG. 1) installed in the plant and the image measured in real time from the image recording unit CT installed in the plant to the same location of the virtual plant of the modeling MD.

The simulation unit SIM may provide fire information based on the synchronized modeling MD and sensor data SG-3, and output a digital twin plant DTP in real time based on the fire information.

The simulation unit SIM may receive action plans and fire evaluation criteria FEC (see FIG. 3) output from the guide unit GD (see FIG. 3). The simulation unit SIM may output the action plan to the digital twin plant DTP. The action plan may include a response procedure. The response procedure may include a response procedure for a route through which a party near a fire place may evacuate, a response procedure according to smoke generation and a smoke movement route, and the like.

The simulation unit SIM may predict the fire risk based on the fire evaluation criteria FEC. The simulation unit SIM may receive big data BD (see FIG. 1) from an external server BS (see FIG. 1). The simulation unit SIM may supplement the digital twin plant DTP based on big data BD (see FIG. 1).

According to the inventive concept, the simulation unit SIM may visually provide information to the party 20 (see FIG. 1) through the digital twin plant DTP. The party 20 (see FIG. 1) may intuitively determine the fire situation through the digital twin plant DTP. Therefore, the fire protection system 10 may reduce the risk of fire in major facilities by intuitively determining and predicting the remaining life, replacement cycle, and maintenance time of various hardware such as facilities, devices, and parts installed in the plant.

Figure 7:
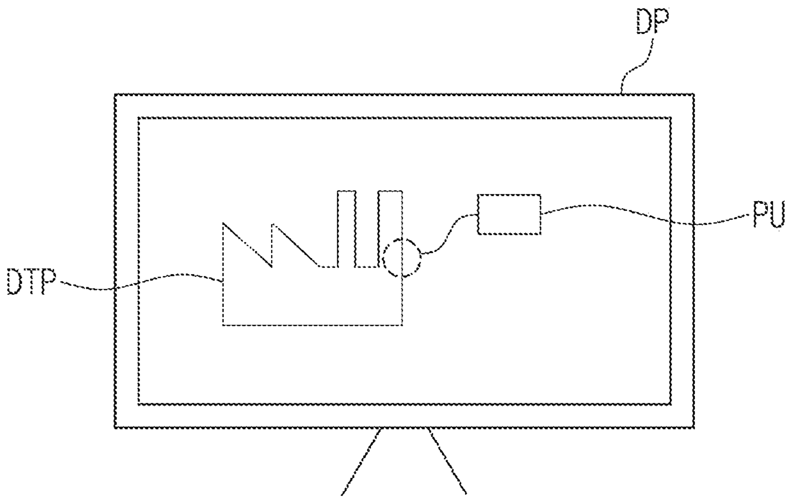
FIG. 7 shows a monitoring screen of a situation room using a digital twin according to an embodiment of the inventive concept.

FIG. 7 illustrates a monitoring screen of a situation room using a digital twin according to an embodiment of the inventive concept.

Referring to FIGS. 1 and 7, the digital twin plant DTP may be displayed on the monitoring screen DP of the situation room.

A plurality of sensors SM and an image collection unit CT installed in the field of the plant may collect data about the plant in the field. The parties 20 may monitor the digital twin plant DTP through the monitoring screen DP of the situation room.

For example, a comprehensive fire protection statistical index of a thermal power plant may be displayed on the monitoring screen DP. The integrated statistical index may include power plant operation time, power plant operation rate, load, and abnormal phenomena. Through this, the parties 20 may predict a fire situation that may occur in the power plant and respond quickly. On the monitoring screen DP, obstacles and issues regarding major operational statuses may be displayed in real time. A fire index for major facilities may be displayed on the monitoring screen DP.

In addition, information on detection of abnormality for each major component may be displayed on the monitoring screen DP. The information may include basic statistics on fire protection for each power plant area, use, and fuel, information about overloads and outliers for each major facility, and information about hourly, daily, and monthly real-time statistics of major components.

The parties 20 may grasp the fire situation of the entire plant through the digital twin plant DTP.

The fire protection system 10 according to an embodiment of the inventive concept may map data between the current plant and the digital twin plant DTP implemented as a digital twin, and provide a simulation-based smart guide PU to the parties 20.

According to the inventive concept, the parties 20 may grasp the overall process of work such as major facilities, facilities, and parts in real time with the digital twin plant DTP provided through the monitoring screen DP and capture abnormal signs of fire. Therefore, even remotely, by using the digital twin, the parties 20 may experience the on-site situation in the same way as the actual situation, and accordingly, accurate determination and action may be taken on the fire anomaly and the fire situation.

Although described above with reference to a preferred embodiment of the inventive concept, a person skilled in the relevant technical field or a person having ordinary knowledge in the relevant technical field will be appreciated that various modifications and changes may be made to the inventive concept without departing from the spirit and scope of the inventive concept described in the claims to be described later. Accordingly, the technical scope of the inventive concept should not be limited to the contents described in the detailed description of the specification, but should be defined by the claims.

The invention claimed is:

1. A fire protection system comprising:

a plurality of sensors having different address values, detecting fire occurrence, generating a fire alarm, and performing Radio Frequency (RF) communication with each other;

a first server configured to perform RF communication with each of the plurality of sensors; and a second server in communication with the first server, wherein the second server comprises:

a building information modeling unit configured to virtually implement a plant and provide modeling;

a synchronization unit configured to synchronize the modeling and a sensor data measured from each of the plurality of sensors; and a simulation unit configured to provide fire information based on the synchronized modeling and the sensor data and outputs a digital twin plant based on the fire information, wherein the simulation unit provides the fire information and outputs the digital twin plant based on a countermeasure plan including a response procedure for vulnerable facilities of the plant.

2. The fire protection system of claim 1, wherein the sensor data comprises at least one of vibration, sound, valve, harmful gas, heat, smoke, flame, and explosion, wherein the simulation unit determines overload, fire, disaster, and disaster signs based on the sensor data.

3. The fire protection system of claim 1, wherein the simulation unit outputs the digital twin plant in real time.

4. The fire protection system of claim 1, wherein the second server receives big data from the outside, wherein the simulation unit complements the digital twin plant based on the big data.

5. The fire protection system of claim 1, wherein the second server further comprises a guide unit for outputting a measure to the digital twin plant based on the fire information.

6. The fire protection system of claim 5, wherein the guide unit comprises a fire evaluation criteria output for each facility of the plant.

7. The fire protection system of claim 6, wherein the guide unit compares the fire evaluation criteria and the sensor data, wherein, when the sensor data exceeds the fire evaluation criteria, the second server outputs a preliminary warning message.

8. The fire protection system of claim 5, wherein the guide unit outputs fire evaluation criteria by space, use, or fuel based on the fire information.

9. The fire protection system of claim 8, wherein the guide unit calculates a probability of fire occurrence based on the fire evaluation criteria, wherein, when the fire occurrence probability is greater than or equal to a predetermined value, the second server outputs a preliminary warning message.

10. The fire protection system of claim 1, wherein the plurality of sensors are further configured to measure humidity and particulate levels, and wherein the second server analyzes these additional measurements to improve the accuracy of detecting fire conditions.

11. The fire protection system of claim 1, wherein the synchronization unit further provides real-time calibration of sensor data based on changing environmental conditions, including but not limited to temperature and humidity.

12. The fire protection system of claim 1, wherein the digital twin includes and displays a visual representation of fire risk levels in different areas of the plant, updated in real-time based on synchronized sensor data.

13. The fire protection system of claim 1, wherein the building information modeling unit is configured to virtually implement building facilities of the plant.

14. The fire protection system of claim 1, wherein the simulation unit providing the fire information and outputting the digital twin plant comprises calculating a probability of fire occurrence for each facility included in the plant based on fire evaluation criteria specific to each facility in the plant and outputting a warning message based on the calculated probability.

15. A fire protection method using digital twin, the method comprising:

measuring a sensor data by a plurality of sensors that sense a fire occurrence and generate a fire alarm;

providing modeling by virtually implementing a plant;

synchronizing the modeling and the sensor data;

providing fire information based on the synchronized modeling and the sensor data; and outputting a digital twin plant based on the fire information, wherein the fire information is provided and the digital twin plant is output based on a countermeasure plan including a response procedure for vulnerable facilities of the plant.

16. The method of claim 15, further comprising outputting an action plan to the digital twin plant based on the fire information.

17. The method of claim 16, wherein the outputting of the action plan comprises:

outputting fire evaluation criteria for each facility included in the plant; and comparing the fire evaluation criteria and the sensor data.

18. The method of claim 17, further comprising outputting a preliminary warning message when the sensor data exceeds the fire evaluation criteria.

19. The method of claim 11, wherein the outputting of the action plan comprises:

outputting fire evaluation criteria for each space, use, or fuel based on the fire information; and calculating a probability of fire occurrence based on the fire evaluation criteria.

20. The method of claim 19, further comprising outputting a preliminary warning message when the fire probability is greater than or equal to a predetermined value.

* * * * *